United States Patent
Bhaumik et al.

(10) Patent No.: US 9,143,896 B2
(45) Date of Patent: Sep. 22, 2015

(54) SYSTEMS AND METHODS FOR PROVIDING A DISTRIBUTED MOBILE CALL CENTER FOR A SERVICE ESTABLISHMENT

(75) Inventors: Vijan Bhaumik, Schaumburg, IL (US); Marisa Lynne Brillhart, Chicago, IL (US); Richard Kevin Lyons, Lake in the Hills, IL (US)

(73) Assignee: Sears Brands, L.L.C., Hoffman Estates, IL (US)

( * ) Notice: Subject to any disclaimer, the term of this patent is extended or adjusted under 35 U.S.C. 154(b) by 607 days.

(21) Appl. No.: 13/273,459

(22) Filed: Oct. 14, 2011

(65) Prior Publication Data
US 2013/0095807 A1    Apr. 18, 2013

(51) Int. Cl.
| | |
|---|---|
| H04M 3/00 | (2006.01) |
| H04M 5/00 | (2006.01) |
| H04W 4/02 | (2009.01) |
| H04M 3/51 | (2006.01) |
| H04M 3/523 | (2006.01) |

(52) U.S. Cl.
CPC ............. *H04W 4/023* (2013.01); *H04M 3/51* (2013.01); *H04M 3/5233* (2013.01)

(58) Field of Classification Search
CPC ...... H04W 3/51; H04W 3/523; H04W 3/5233
USPC ............. 379/265.01, 265.02, 265.04, 265.11, 379/265.12
See application file for complete search history.

(56) References Cited

U.S. PATENT DOCUMENTS

| | | | | |
|---|---|---|---|---|
| 6,272,347 | B1 * | 8/2001 | Griffith et al. | 455/445 |
| 6,754,335 | B1 * | 6/2004 | Shaffer et al. | 379/266.02 |
| 8,009,822 | B1 * | 8/2011 | Boutcher et al. | 379/265.11 |
| 8,068,601 | B2 * | 11/2011 | Shaffer et al. | 379/266.02 |
| 8,913,736 | B2 * | 12/2014 | Kohler et al. | 379/265.11 |
| 2003/0198337 | A1 * | 10/2003 | Lenard | 379/265.14 |
| 2005/0195960 | A1 * | 9/2005 | Shaffer et al. | 379/265.02 |
| 2009/0279681 | A1 * | 11/2009 | McKee et al. | 379/201.02 |
| 2010/0169147 | A1 * | 7/2010 | McCormack et al. | 705/9 |
| 2010/0226490 | A1 * | 9/2010 | Schultz et al. | 379/265.09 |
| 2010/0322407 | A1 * | 12/2010 | Erhart et al. | 379/266.01 |

OTHER PUBLICATIONS

Examiner's Requisition for Canadian Patent Application No. 2,792,131, dated May 22, 2014 (3 pages).

* cited by examiner

*Primary Examiner* — Nafiz E Hoque
(74) *Attorney, Agent, or Firm* — McAndrews, Held & Malloy, Ltd.

(57) ABSTRACT

A method and system for distributing a service center call. The method and system include hosting an electronic database of information regarding service agent availability, providing a user interface for allowing a service agent to update the database regarding the availability of the service agent to receive service calls, and receiving a customer service call request. To route the customer service call request, the method and system determines the location of a customer originating the customer service call request, determines availability of at least one service agent within a predetermined location threshold of the location of the customer, and routing the customer service call request to the local service agent or to a service agent outside of the predetermined location threshold of the location of the customer if there are no available service agents within the predetermined location threshold of the location of the customer.

26 Claims, 4 Drawing Sheets

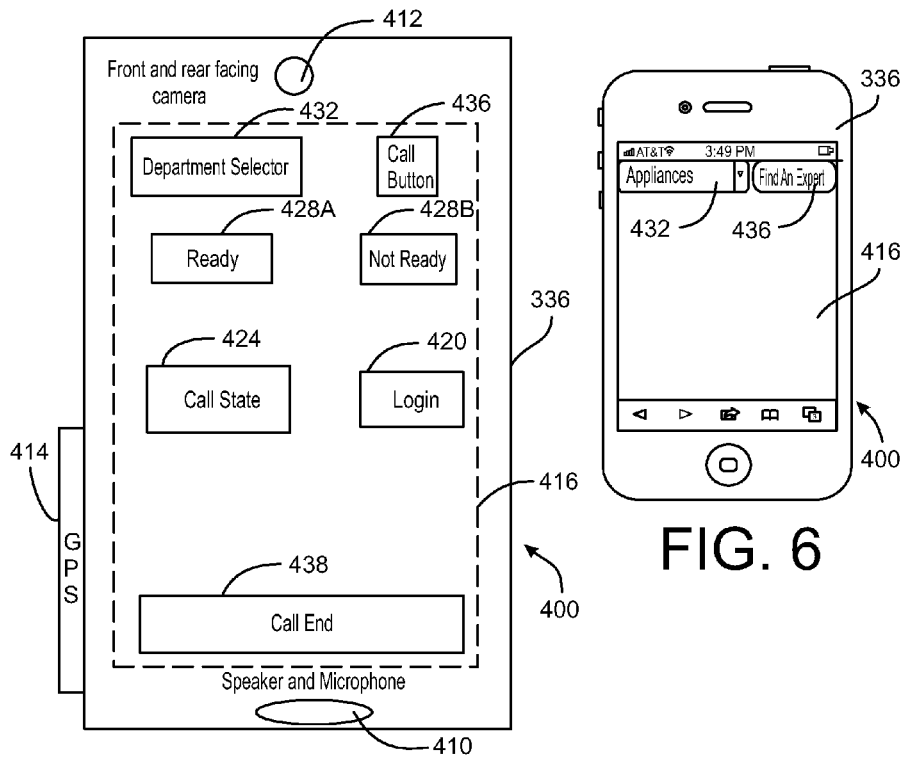
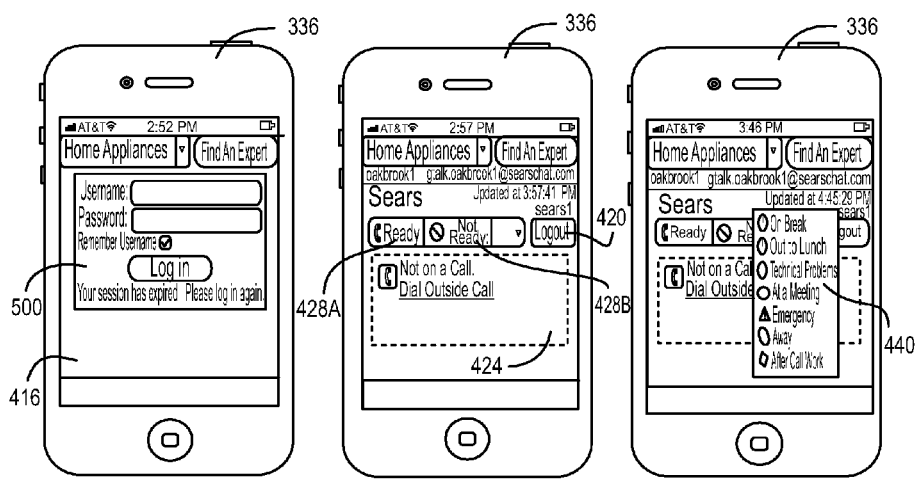

SYSTEMS AND METHODS FOR PROVIDING A DISTRIBUTED MOBILE CALL CENTER FOR A SERVICE ESTABLISHMENT

FIELD OF THE DISCLOSURE

The subject invention generally relates to systems and methods for a distributed virtual call center and more particularly, to systems and methods for providing a distributed mobile call center for a service establishment.

BACKGROUND

In a traditional call center, agent mobility is restricted due to the need of access to switch networks, computing platform and telephony devices which are all location dependent. In contrast, in the disclosed distributed virtual call center the agents can be at any location (distributed geographically) at any time and function as a customer service agent.

In still other known call centers, a virtual network of service agents may be provided. The service agents, however, are selected not on a geographic preference to the originator of the service call request, but rather on a first available agent basis, or based on a service agent ranking. In this manner, the customer may be connected to a virtual service center, but receives no benefit of having a service agent at the same or proximate location as the customer requesting service. In some instances, even if the location of the virtual service agent is taken into consideration, the location preference is based on the network structure or performance, and not based upon the proximately of the service agent to the location of the service call originator.

While the background systems and methods identified herein, which are incorporated herein by reference in their entirety, generally work for their intended purpose, the subject invention provides improvements thereto, particularly by providing a customer with the ability to connect to a service employee located in a geographically beneficial location to provide additional customer support.

BRIEF DESCRIPTION OF THE DRAWINGS

For a better understanding of the present disclosure, reference may be had to various examples shown in the attached drawings.

FIG. 4 illustrates an example user interface for implementing an example distributed service call center in accordance with the present disclosure.

FIGS. 5A-5C together illustrate an example user interface for registering an agent with the example distributed service call center in accordance with the present disclosure.

FIG. 6 illustrates an example user interface for placing a service center call request with the example distributed service call center in accordance with the present disclosure.

DETAILED DESCRIPTION

The distributed service center concept is explained hereinbelow. In general a customer calls in and the network receives the call and routes it through the network on predetermined business logic. The distributed concept frees up the call center agents from being bound to a specific location. As long as they have access to a mobile device, they would be able to handle customer assistance calls.

In one example, the system provides the use of commodity hardware, off the shelf software, OS independent applications, form factor independent devices (PC, tablets, smart phones etc), media independent (voice, text, video) and cloud based infrastructure to run all functionalities of the call center. This is in contrast to the specialized hardware, proprietary software and dedicated networks to run a call center which are custom built for such applications. In the context of a service establishment, such as, for example, a retail store this is specifically very useful as customer service calls with regards to product information, product demo, diagnostics, etc. can be handled by sales floor associates who have the most expertise and relevant information and who are located proximate to the customer.

Figure 1:
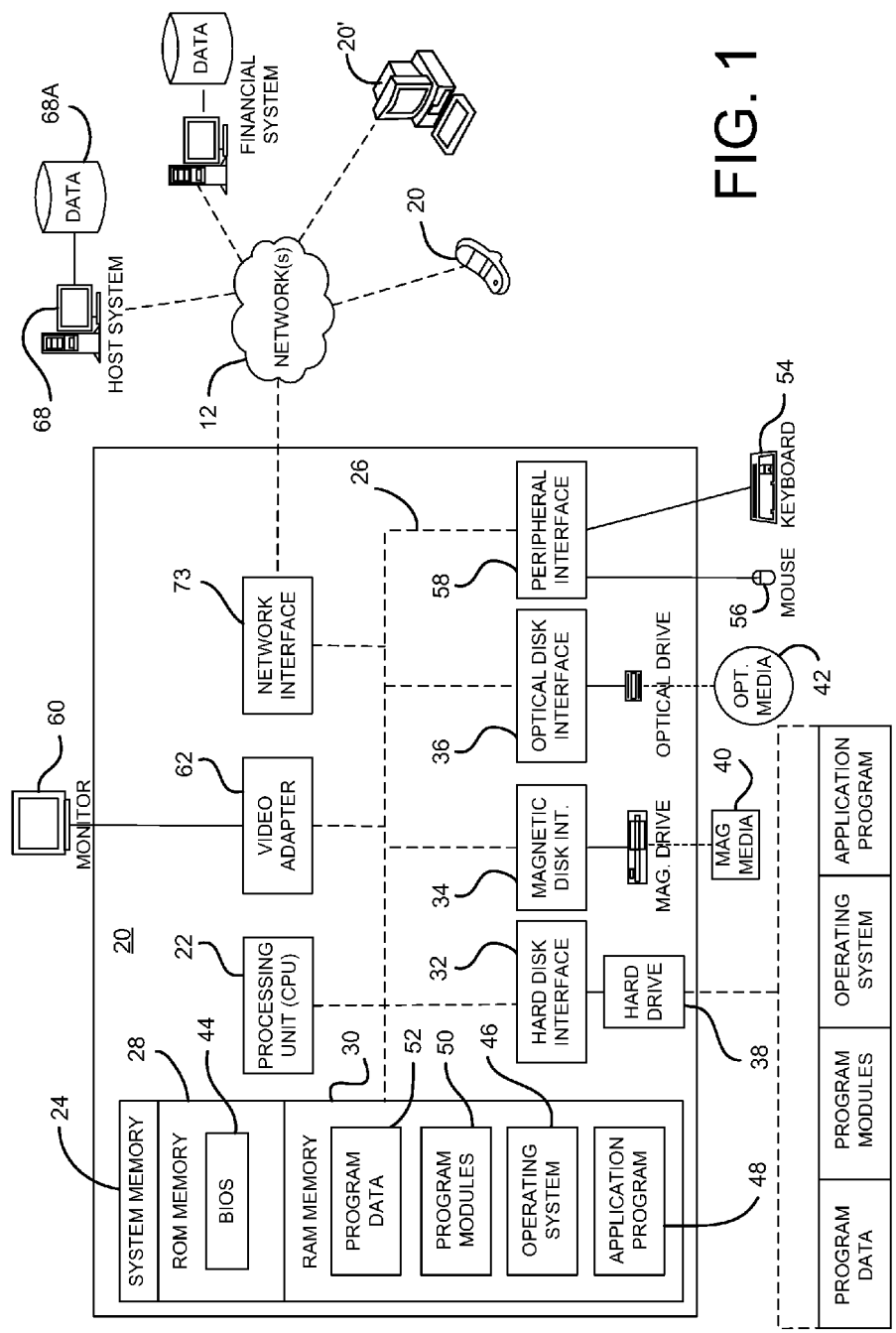
FIG. 1 illustrates in block diagram form components of an example, computer network environment suitable for implementing the example distributed service call centers disclosed.

With reference to the figures, the following discloses various example systems and methods for providing distributed mobile video call centers on a computer network. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, consumer, etc., to access a host system server 68 and, among other things, be connected to a distributed mobile call center. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, etc.

For performing tasks as needed, the host system server 68 may include many or all of the elements described above relative to the processing device 20. In addition, the host system server 68 would generally include executable instructions for, among other things, receiving a request for a service call center connection, routing the request via a distributed mobile video call center, and providing a service call infrastructure for providing the requestor with a distributed customer service experience.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
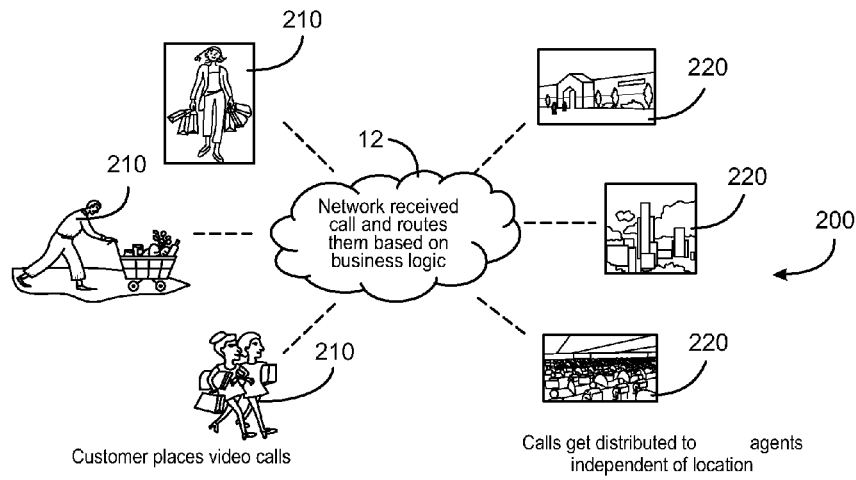
FIG. 2 illustrates an example distributed service call center in accordance with the present disclosure.

Referring to FIG. 2, there is illustrated an overview of an example call center distribution system 200 in accordance with an example of the present disclosure. The system 200 is well-suited for operation on a distributed network system, such as, for example, the Internet, cloud, mobile network, cellular network, or other suitable wired and/or wireless network. The system 200 may be implemented in various other communication networks and/or mediums as desired including, for example, a localized, non-distributed network.

Generally speaking, the system 200 is operable to facilitate a distributed service call between a customer and a service agent independent of the service agents physical connection with a traditional call center. For instance, in the illustrated example, a customer 210 (e.g., a user, consumer, shopper, etc.), having need of customer assistance, places a phone call, such as a video phone call, to a customer service server (e.g., the host server 68) through any suitable network such as the network 12. In this example, the network 12 is coupled to the host server 68 to distribute the call to one of a plurality of customer service agents 220 geographically distributed in independent locations.

In this example, the distributed customer service agent 220 can be any individual with access to a service center call device, such as a mobile service center call device. The agent may be located locally to the call initiator, or may be located anywhere remotely in the agent network. For example, the agent may be located in the same service establishment (e.g., retail sale) location as the caller, or may be at another sales location, such as an outlet, service department, call center, etc.

Figure 3:
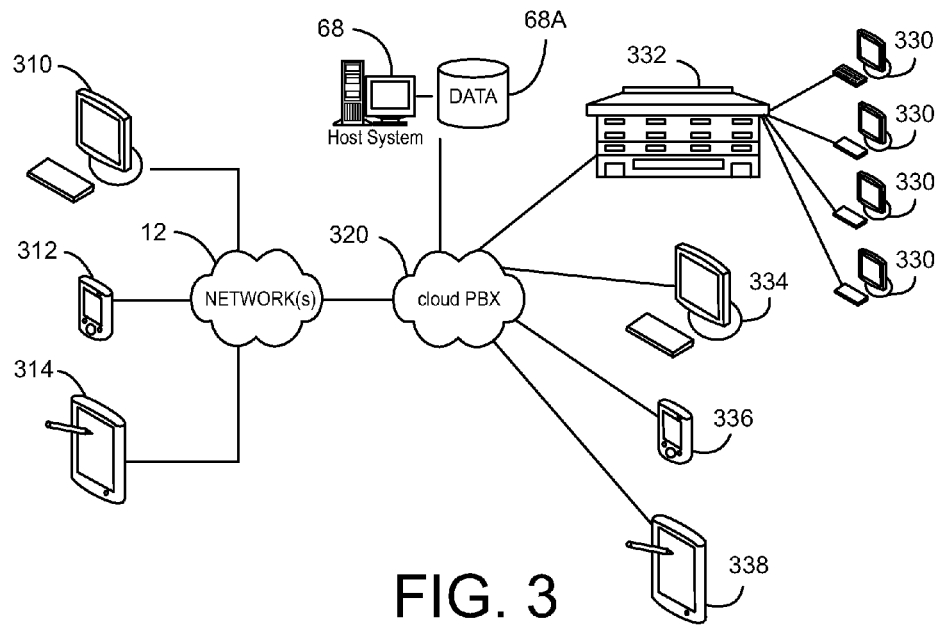
FIG. 3 illustrates another example distributed service call center in accordance with the present disclosure.

As illustrated in more detail in FIG. 3, in this example, the customer 210 remotely initiates a customer service call through any suitable device, such as a computer system 310, a smart phone 312, a tablet computer 314, or any other suitable known or yet to be developed communication device. In the disclosed example, the communication device is capable of video transmission (e.g., video chat, video phone, etc), but it will be appreciated by one of ordinary skill in the art that the communication device may be any suitable communication device including any voice and/or text communicator without use of video transmission. Once the service call is initiated, the call is routed through the network 12 to the host server 68. In this example, routing of the service call utilizes a cloud based private branch exchange (PBX) 320, although any appropriate routing device (software, firmware, hardware, and/or the like) may be utilized. The service call is then routed to the best available customer service associate based on a predetermined business logic, one example of which will be described below. The available customer service agent may include one of a plurality of centralized associates located at terminals 330 associated with a traditional call center 332, or a distributed associate located at a personal computer 334, a smart phone 336, a tablet computer 338, or any other device.

The illustrated call center approach may take advantage of the convergence of mobile devices, IP telephony (e.g., VoIP, SIP, etc) and Internet application such as, for example, Facetime, Skype, etc. The example call center system may also enable interactive communications amongst customer service agents, customers, retail associates and partners, etc., across varied platforms, (e.g., iOS, Android, Windows, etc.), devices (e.g., Mobile phones, PCs, Macs, Tablets, etc), networks (e.g., Wi-Fi, 3G, 4G, etc.), and media (e.g., voice, text, video, etc).

Turning to FIGS. 4, 5A-5C, and 6, there is illustrated one example user interface including user interface elements for conducting a service center call in accordance with the teachings of the present disclosure. For instance, FIG. 4 illustrates an example user interface 400 shown in schematic form. In the illustrated example, the user interface 400 may be displayed on a communication device, such as the smart phone 336. The example smart phone 336 includes speaker and microphone 410, a camera 412 (e.g., a front and/or rear facing camera), and an external and/or internal location device 414, such as a global positioning system or other positioning system such as a cellular network positioning system, indoor positioning system (e.g., RFID, Bluetooth, Wi-Fi access, etc.). The smart phone 336 also includes a display 416 capable of displaying user interface elements to a user, and in this example, capable of receiving physical stimulations (e.g., touch) which may be interpreted by the smart phone 336 as input into the device. It is to be understood that the illustrated device is merely representative of one possible device capable of conducting a service center call and that other devices user interfaces, applications, and/or components may be used and/or omitted as desired.

In the examples illustrated in FIGS. 4 and 5A-5C, the user interface 400 include user interface elements representative of one user interface that could be utilized by a customer service agent. In this example, the user interface 400 includes a plurality of selectable elements on the display 416. For instance, the user interface 400 includes a log-in/log-out selectable element 420, a call status selectable element 424, at least one agent status selectable element 428, a department (e.g. category) selectable element 432, a call initiator selectable element 436 and/or a call terminator selectable element 438. It will be understood that the user interface may eliminate or include additional elements as desired. Additionally, while some elements are illustrated as separate and/or combined elements, one of ordinary skill in the art will appreciate that the elements may be combined and/or separated as desired.

As shown in FIG. 5A, when the log-in/log-out selectable element 420 is selected (e.g., the element 420 is in a log-in mode), the user interface 400 displays a log-in element 500 which prompt the agent to log-in to the host server 68 to register the agent with the host server 68 and allow the agent to be eligible to receive service calls. If the agent is already logged-in to the host server 68, the element 420 will be in a log-out mode, allowing the agent to select the element 420 and de-authorize the agent from the host server 68. Although illustrated as a username and password combination in FIG. 5A, The log-in element 500 may be any suitable registration interface including, for example, a PIN, a swipe pattern, a biometric password, a user id and password combination, and/or any other authorization scheme. Additionally, the log-in requirement(s) may be secure, and/or unsecure as desired. As noted above, once the agent log-in is successful, the log-in/log-out element 420 may be updated to be in a log-out mode, allowing the agent to log-out from the host server 68 as desired.

Once the agent is logged-in, or otherwise registered with the host server 68, the agent may be presented with a plurality of user interface elements as described above, and as illustrated in FIGS. 4 and 5B-5C. For instance, the user interface may include the agent status selectable element 428 which in this example includes a uniquely selectable "Ready" and "Not Ready" portion 428A and 428B, respectively. In this instance, the agent can select the "Ready" portion 428A to indicate to the host server 68 that the agent is available to receive service calls. If, however, the agent is busy and unable to accept calls, the agent may select the "Not Ready" portion 428B of the element 428, to indicate to the host server 68 that the host server 68 should not connect any service calls to the agent. In the example illustrated in FIG. 5C, the "Not Ready" portion 428B may include a plurality of selectable elements 440 indicating a reason for the unavailability of the agent. In this instance, by selecting a reason for unavailability, the host server 68 may utilize the information in any suitable manner, including agent performance evaluations, program evaluations, optimization of business logic, statistical analysis, and/or modification of the business logic processing, or any other suitable manner.

In addition to the identified elements, the user interface 400 may include the call state element 424 best illustrated in FIG. 5B. The call state element 424 displays the status of any currently conducted service call. For instance, as illustrated, the call state element 424 provides the agent with a visual indication that the agent is not currently on a service call. It will be understood that the call state element 424 may provide the agent with any suitable information and/or processing choices, including the ability to dial an outside line, etc. The agent may terminate a service call by selecting the call terminator selectable element 438 as is known. It will be understood that the service call may be conducted in video mode, and thus the video call may be displayed on any suitable portion of the display 416, and may utilize the camera 412 as appropriate.

Turning to FIG. 6, there is illustrated an example user interface 400 that may be provided to the user 210 seeking to establish a service call with an agent 220. In this example, the user interface 400 includes the display 416 for conducting a video service call, the department selectable element 432, and the call initiator selectable element 436. In this example, the department selectable element 432 includes the ability for the user to select the area of expertise that the user is looking to receive help on. For instance, the user may select appliances, electronics, bedding, or any other category. It will be appreciated that the department selectable element 432 may be eliminated as desired and the service call may be generally connected and routed through any desired means, including automatic call distributor (ACD), Interactive voice response (IVR) routing, etc. The user may select the call initiator element 436 to connect to a service agent registered with the host server 68.

In one example, a user can start a service call with an agent by scanning an identifying code, such as for example, a bar code, a two-dimensional bar code (e.g., a QR Code, etc.), or other similar identifying code. Alternatively, the user may initiate a service call through a voice, text, and/or video call application, and/or may further initiate a call through a mobile website. The initiation of the service call may be tied to a generic number/address/code, or may be specialized to a product, department, location, etc. For example, the user can scan a generic two-dimensional bar code such as a QR Code, wherein the QR Code initiates the user interface 400 for assisting in connecting the user with the current service call agent. As noted above, the user interface 400 may provide various department and/or other selectable identifying elements to assist in directing the user to the correct service call agent. Still further, if a more specific means of initiating the call is performed (e.g., a specialized code, SKU number, QR code, etc.), the code may be resolved by the user interface 400, the host server 68, and/or any other element of the system to ensure the call gets routed accordingly.

In one example, a user in a retail location wishes to receive a customer service call directed toward a retail item such as a table saw. The user can initiate a service center call through their mobile device by scanning a code, or by calling a telephone number. The user's call is routed to an agent with saw expertise to discuss the purchase of a table saw to ensure the user gets the correct product. The saw can be demonstrated live to the user (if video equipped) and key features may be highlighted for the user's benefit. The user and service call agent may located in the same retail location, or may be located in separate (e.g., remote) locations as necessary. Still further, the user's and/or the agent's location may be identified through the use of the location device 414, allowing the user and/or agent to recommend additional services based upon their location, to find each other if in the same general vicinity (even within the same retail location, such as, for example, through internal store based location services), and/or identify additional location based specials, services, coupons, etc. The user and/or agent may be able to utilize external and/or internal mapping services to direct and/or to be directed to additional items of interest, etc.

In another example, a user attempting to purchase an item may initiate a service call due to a sizing and/or color question. Again, the user initiates that call through any suitable means, and is connected to a service agent. A customer service agent may be able to exchange videos, and hold a conversation with the shopper from a remote location and provide advice on the size, color, shipping options, sales, etc., all while the user is looking at the merchandise in the retail location. The service agent may recommend additional color selections and/or sizes available at other location close to the user (via location services), may suggest coordinating items, arrange for delivery of the item that is out of stock, etc.

In still another example, a user can initiate a call regarding an item that may be in need of repair, such as for example, an appliance in the user's home. The user can initiate the service call and provide the service agent with a visual picture of the offending part that may be in need or repair. By being able to visually see the item the service agent may be able to identify the right part, provide warranty and/or service information, and/or schedule a repair service call.

Finally, in still another example, a user may shop at home and/or other location outside of the retail location and may call to inquire about a sale item, an item for retail purchase, and/or an outlet item. For example, a user may see an advertisement including a QR Code for more information regarding an item for sale. From the user's device, the call may be connected to a service agent at the location of the item (e.g., a sales associate at the retail location) where the agent may be able to provide visual information and/or a description of the item for use by the user to determine whether they wish to buy the item. The service agent may complete the sale while the user is on the service call, and may have the item delivered and/or have the item waiting the user for immediate impact, thereby streamlining the purchasing process.

Figure 7:
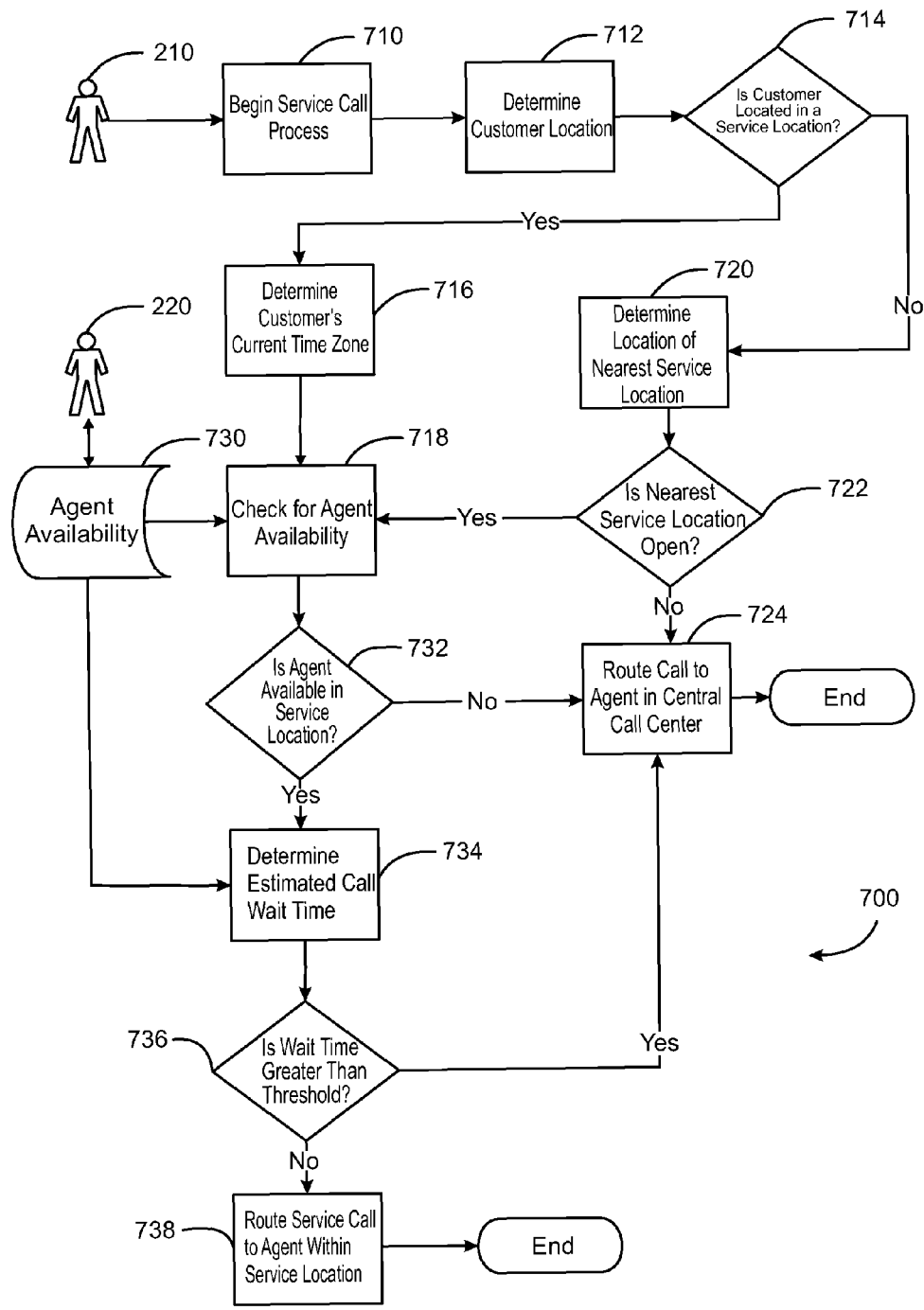
FIG. 7 illustrates a detailed flowchart of an example method and system for processing a service center call request in accordance with the present disclosure.

Referring to FIG. 7, there is illustrated a flowchart of an example service center process 700 that may be implemented on a computer system and/or provided on a non-transitory computer readable medium to implement the service center call system described herein. While in the described example, a retail location is described, it will be appreciated that the disclosed processes and systems may be implemented in any suitable environment, including, for example, any service location, or other environment where a service call may be placed.

In the example of FIG. 7, the process 700 begins at block 710 when a customer initiates a service center call. As previously noted, the call may be initiated through the scanning of an identifying code, such as for example a QR Code, through a application such as a website and/or communication application and/or may be initiated with a traditional phone call. At block 712, the customer's location may be determined through any available means, including, for instance, through global positioning (GPS), cellular network location identification, radio frequency identification (RFID), Bluetooth, wireless network identification (Wi-Fi), unique identifier in the scanned identification code, zip code, interactive voice response, Dual Tone Multiple Frequencies (DTMF) tones, or any other suitable location determination process.

Upon determination of the customer's location, the process 700 determines whether the customer is located within a service location, such as for example a retail location, or at least within a suitable distance threshold to be considered at the service location at block 714. The process of determining whether the customer is in a specific service location may be determine through any suitable determination process, including a comparison between the determined location and a listing of known service locations, a determination whether the customer is on an identifiable network, or other determination process.

If the customer is located within or sufficiently near a service location, the process 700 may determine the customer's current time and/or time zone at block 716 and check for agent availability at block 718. If, however, the process 700 determines that the customer is not located at a service location, such as for instance a retail establishment, the process will determine the location of the nearest service location at a block 720. Because the customer may be near multiple service locations, and/or because the customer may have a preference for a particular service location, the process 700 may query the customer and allow the customer the ability to choose from multiple location options. At block 722, the process 700 may determine whether the desired location is open for business, and if so, process with continue at block 718 by checking for agent availability. Otherwise, if no location is open for business, the call will be processed at block 724 by routing the call to an agent in a centralized call center.

In checking for agent availability at block 718, the process 700 may rely upon a listing of agent availability 730. The agent availability 730 may be, for example, an electronic record of data stored in the data repository 68A. In this example, the agent availability 730 is populated by agents utilizing the user interface previously described in connection with FIGS. 4 and 5A-5C. Relying upon the agent availability data, at block 732, the process 700 determines whether there is an agent available in the same service location as the customer. In this example, if there is not an available agent, process continues with block 724, where the call is routed to an agent in the centralized call center If, however, the process 700 determines that there is an agent available at the customer's service location, at block 734 the process 700 may determine the estimated call wait time utilizing agent availability 730 and/or any other statistical analysis. At block 736, the process 700 may determine whether the estimated with time is greater than an acceptable threshold, and if so, route the call to an agent in a central call center at block 724. As will be appreciated by one of ordinary skill in the art, routing calls through a central call center may be performed utilizing any suitably known or yet to be developed call center distribution technology.

If the process determines the wait time is within sufficient parameters for a successful service center call, the call may be routed to an agent within the service location at block 738. The service call may be conducted as desired, and may also include various identifying information including the customer location, the item of interest, any memberships and/or VIP status, etc. In this way, the agent may best be able to service the local customer's concerns and/or questions. It will further be understood that in various other examples, the call may not be routed directly to an agent in the customer's service location, but rather may be directed to an expert at another location (e.g., at another service location or at a central call center) as desired. For example, if an agent in another service location has particular expertise in a certain product, the process 700 may route the customer directly to the expert as necessary. In this way, the agent availability 730 may include predetermined logic to rank and/or identify agent characteristics and expertise to best route the customer through the service call experience.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transitory computer-readable medium having stored thereon computer executable instructions, wherein the instructions perform steps for distributing a service center call, comprising:
    hosting a database of information regarding service agent availability;
    providing a user interface comprising user interface elements for allowing a service agent to update the database regarding the availability of the service agent to receive service calls;
    receiving a customer service call request;
    determining the location of a customer originating the customer service call request;
    determining an estimated amount of time until at least one service agent within a predetermined location threshold of the location of the customer is expected to be available to service the customer service call request;
    routing the customer service call request to the at least one service agent within the predetermined location threshold of the location of the customer, if only one service agent is currently available to receive service calls and the estimated amount of time is less than or equal to a predetermined response time threshold;
    allowing the customer to choose a service location, if a service agent is currently available to receive service calls at each of two or more service locations within the predetermined location threshold of the location of the customer and the estimated amount of time is less than or equal to the predetermined response time threshold, and routing the customer service call request to the available service agent at the service location chosen the customer;
    routing the customer service call request to a service agent outside of the predetermined location threshold of the location of the customer, if there are no available service agents within the predetermined location threshold of the location of the customer, and
    routing the customer service call request to a service agent outside of the predetermined location threshold of the location of the customer, if the estimated amount of time is greater than a predetermined response time threshold.

2. The non-transitory computer readable medium as defined in claim 1, wherein determining the location of the customer further comprises identifying whether the customer is in a service location.

3. The non-transitory computer readable medium as defined in claim 2, wherein the service location is a retail establishment.

4. The non-transitory computer readable medium as defined in claim 2, wherein routing the customer service call request further comprises routing the customer service call request to a service agent located in the same retail location as the customer.

5. The non-transitory computer readable medium as defined in claim 1, wherein determining availability of at least one service agent within a predetermined location threshold of the location of the customer to service the customer service call request further comprises determining availability of at least one service agent closest to the location of the customer.

6. The non-transitory computer readable medium as defined in claim 5, further comprising routing the customer service call request to the at least one service agent closest to the location of the customer.

7. The non-transitory computer readable medium as defined in claim 1, wherein the customer service call request initiates a video call from the customer.

8. The non-transitory computer readable medium as defined in claim 1, wherein the customer service call request is initiated by the customer by scanning a scannable code using a personal communication device of the customer.

9. The non-transitory computer readable medium as defined in claim 1, wherein determining the location of the customer includes at least one of utilizing global positioning system data, utilizing network utilization data, or utilizing indoor positioning data.

10. The non-transitory computer readable medium as defined in claim 1, wherein the user interface further includes user interface elements to allow the customer to originate the customer service call request.

11. The non-transitory computer readable medium as defined in claim 10, wherein the user interface further includes user interface elements to allow the customer to conduct the customer service call request with the service agent.

12. The non-transitory computer readable medium as defined in claim 1, wherein the user interface is provided on a mobile device.

13. A computer system for distribution of a service center call, the system comprising:
    a database provided with information regarding the availability of a plurality of service agents;
    a user interface comprising user interface elements to allow the service agents to update the database with information regarding their availability to receive a customer service call;
    a receiver for receiving a customer service call request; and
    a processor to determine the location of the origination of the customer service call request,
    to access the database to determine an estimated amount of time until availability of at least one service agent within a predetermined location threshold of the location of the origination of the customer service call request, to route the customer service call request to the at least one service agent within the predetermined location threshold of the location of the origination of the customer service call request, if only one service agent is currently available to receive service calls and the estimated amount of time is less than or equal to a predetermined response time threshold, to allow the customer to choose a service location, if a service agent is currently available to receive service calls at each of two or more service locations within the predetermined location threshold of the location of the customer and the estimated amount of time is less than or equal to the predetermined response time threshold, and route the customer service call request to the available service agent at the service location chosen the customer, to route the customer service call request to a service agent outside of the predetermined location threshold of the location of the origination of the customer service call request, if there are no available service agents within the predetermined location threshold of the location of the origination of the customer service call request, and to route the customer service call request to a service agent outside of the predetermined location threshold of the location of the customer, if the estimated amount of time is greater than a predetermined response time threshold.

14. The computer system as defined in claim 13, wherein the processor further determines the location of the customer by identifying whether the customer is in a retail location.

15. The computer system as defined in claim 14, wherein the processor routes the customer service call request to an service agent located in the same retail location as the origination of the customer service call request.

16. The computer system as defined in claim 15, wherein the processor determines availability of at least one service agent within a predetermined location threshold of the location of the origination of the customer service call request by determining availability of at least one service agent closest to the location of the customer.

17. The computer system as defined in claim 13, wherein the customer service call request initiates a video call from the customer.

18. The computer system as defined in claim 13, wherein the processor determines the location of the origination of the customer service center call by at least one of utilizing global positioning system data, utilizing network utilization data, or utilizing indoor positioning data.

19. The computer system as defined in claim 13, wherein the user interface further comprises user interface elements to allow the customer to originate the customer service call request.

20. The computer system as defined in claim 19, wherein the user interface further comprises user interface elements to allow the customer to conduct the customer service call request with the service agent.

21. The computer system as defined in claim 13, wherein the user interface is provided on a mobile device.

22. A method of operating a computer system for distributing service center calls, the method comprising:

in at least one processor of the computer system operable to communicate with a terminal device of a customer, hosting a database of information regarding service agent availability;

providing a user interface comprising user interface elements for allowing a service agent to update the database regarding the availability of the service agent to receive service calls;

receiving a customer service call request;

determining the location of a customer originating the customer service call request;

determining availability of at least one service agent within a predetermined location threshold of the location of the customer to service the customer service call request;

routing the customer service call request to the at least one service agent within the predetermined location threshold of the location of the customer, if only one service agent is currently available to receive service calls and the estimated amount of time is less than or equal to a predetermined response time threshold;

allowing the customer to choose a service location, if a service agent is currently available to receive service calls at each of two or more service locations within the predetermined location threshold of the location of the customer and the estimated amount of time is less than or equal to the predetermined response time threshold, and routing the customer service call request to the available service agent at the service location chosen the customer;

routing the customer service call request to a service agent outside of the predetermined location threshold of the location of the customer, if there are no available service agents within the predetermined location threshold of the location of the customer, and routing the customer service call request to a service agent outside of the predetermined location threshold of the location of the customer, if the estimated amount of time is greater than a predetermined response time threshold.

23. The method as defined in claim 22, wherein determining the location of the customer further comprises identifying whether the customer is in a retail location.

24. The method as defined in claim 23, wherein routing the customer service call request further comprises routing the customer service call request to an agent located in the same retail location as the customer.

25. The method as defined in claim 22, wherein determining availability of at least one service agent within a predetermined location threshold of the location of the customer to service the customer service call request further comprises determining availability of at least one service agent closest to the location of the customer.

26. The method as defined in claim 22, wherein the user interface is provided on a mobile device.

* * * * *